(12) United States Patent
Xiong et al.

(10) Patent No.: US 10,212,465 B2
(45) Date of Patent: *Feb. 19, 2019

(54) METHOD AND SYSTEM FOR VOICE RECOGNITION INPUT ON NETWORK-ENABLED DEVICES

(71) Applicant: SONY INTERACTIVE ENTERTAINMENT LLC, San Mateo, CA (US)

(72) Inventors: True Xiong, San Diego, CA (US); Charles McCoy, Coronado, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,474

(22) Filed: Nov. 14, 2016

(65) Prior Publication Data

US 2017/0061964 A1 Mar. 2, 2017

Related U.S. Application Data

(62) Division of application No. 13/790,426, filed on Mar. 8, 2013, now Pat. No. 9,495,961.

(51) Int. Cl.
| | | |
|---|---|---|
| G06F 17/20 | (2006.01) |
| G06F 17/27 | (2006.01) |
| G10L 15/26 | (2006.01) |
| G10L 21/00 | (2013.01) |
| H04N 21/258 | (2011.01) |
| H04N 21/441 | (2011.01) |
| H04N 21/41 | (2011.01) |
| H04N 21/45 | (2011.01) |
| G10L 15/00 | (2013.01) |
| G10L 15/22 | (2006.01) |
| G10L 15/30 | (2013.01) |
| H04N 21/81 | (2011.01) |
| H04N 21/25 | (2011.01) |

(52) U.S. Cl.
CPC ..... *H04N 21/25816* (2013.01); *G10L 15/005* (2013.01); *G10L 15/22* (2013.01); *G10L 15/26* (2013.01); *G10L 15/30* (2013.01); *H04N 21/25875* (2013.01); *H04N 21/4126* (2013.01); *H04N 21/441* (2013.01); *H04N 21/4508* (2013.01); *H04N 21/8173* (2013.01); *G10L 2015/221* (2013.01); *G10L 2015/223* (2013.01); *H04N 21/25* (2013.01)

(58) Field of Classification Search
None
See application file for complete search history.

(56) References Cited

U.S. PATENT DOCUMENTS 5,267,323 A 11/1993 Kimura
6,999,932 B1 2/2006 Zhou
(Continued)

FOREIGN PATENT DOCUMENTS

WO 2011/132150 A2 10/2011

*Primary Examiner* — Satwant Singh
(74) *Attorney, Agent, or Firm* — Mayer & Williams PC

(57) ABSTRACT

Apparatus and methods to implement a technique for using voice input to control a network-enabled device. In one implementation, this feature allows the user to conveniently register and manage an IPTV device using voice input rather than employing a bulky remote control or a separate registration website.

9 Claims, 14 Drawing Sheets

(56) References Cited

U.S. PATENT DOCUMENTS

| | | |
|---|---|---|
| 2004/0073432 A1 | 4/2004 | Stone |
| 2004/0128129 A1 | 7/2004 | Sherman |
| 2006/0136220 A1 | 6/2006 | Gurram |
| 2006/0155549 A1 | 7/2006 | Miyazaki |
| 2009/0177477 A1* | 7/2009 | Nenov ................. A61B 5/0002 704/275 |
| 2009/0240488 A1 | 9/2009 | White |
| 2009/0313007 A1* | 12/2009 | Bajaj .................... G06F 17/289 704/3 |
| 2010/0250231 A1* | 9/2010 | Almagro ............... G06F 17/289 704/2 |
| 2011/0060592 A1* | 3/2011 | Kang ............... H04N 21/42684 704/275 |
| 2012/0124615 A1* | 5/2012 | Lee .................. H04N 21/25875 725/30 |
| 2013/0036442 A1 | 2/2013 | Wingert |
| 2013/0290567 A1 | 10/2013 | Seymour |
| 2014/0057611 A1* | 2/2014 | Homma ............. G01C 21/3682 455/414.1 |
| 2014/0242955 A1* | 8/2014 | Kang ................... G06F 17/289 455/414.1 |
| 2016/0080569 A1 | 3/2016 | Lee |
| 2016/0104511 A1 | 4/2016 | An |
| 2016/0148616 A1 | 5/2016 | Takayanagi |

\* cited by examiner

METHOD AND SYSTEM FOR VOICE RECOGNITION INPUT ON NETWORK-ENABLED DEVICES

CROSS-REFERENCE TO RELATED APPLICATIONS

This application is a divisional of U.S. patent application Ser. No. 13/790,426, filed Mar. 8, 2013, entitled "METHOD AND SYSTEM FOR CONTROLLING NETWORK-ENABLED DEVICES WITH VOICE COMMANDS", and incorporates by reference in their entireties U.S. patent application Ser. No. 12/982,463, filed Dec. 30, 2010, entitled "DEVICE REGISTRATION PROCESS FROM SECOND DISPLAY", which claims benefit of priority of U.S. Provisional Patent Application No. 61/412,312, filed Nov. 10, 2010, entitled "DEVICE REGISTRATION PROCESS FROM $2^{ND}$ DISPLAY"; and U.S. patent application Ser. No. 12/844,205, filed Jul. 27, 2010, entitled "CONTROL OF IPTV USING SECOND DEVICE", both of which are owned by the assignee of the present invention.

BACKGROUND

Internet delivery of digital content to IPTVs continues to increase, as does the popularity of IPTVs themselves. As for many digital devices, especially those on networks, device registration of IPTVs can lead to many benefits for users. A key benefit for registration of IPTVs is association with a user account that allows access to various services. However, user registration for an IPTV device is inconvenient. The user needs to either leave the living room to access a PC, which is inconvenient, or perform the registration directly on the IPTV, which generally has a poor input interface. For example, in some systems a registration code is entered into a web browser on the device using a remote control. While the user need not leave the location of the device, most remote controls are not designed for significant amounts of data entry.

One successful attempt to remedy the situation is by allowing a user to employ a second display, e.g., a cell phone or tablet computer, to assist in the performance of the registration by entering data on a more user-friendly device. While highly convenient in many situations, less tech-savvy users may still encounter difficulty in performing the necessary functions to register an IPTV, e.g., downloading an application, configuring the second display with their device, and so on.

Studies have indicated that a high percentage of users of IPTVs and other network-enabled devices, e.g., Blu-ray® players, do not register their devices. Not only do the users miss out on the benefits of registration but network providers miss out on receiving business information about such users, which may be employed to improve services and advertising to the consumer. Accordingly, there is a need to make even more convenient the registration process of devices such as IPTVs, and thereby enable users to more conveniently receive the benefits of such registration. Moreover, there is a need to improve the overall user experience of data entry to such devices.

SUMMARY

In implementations of the systems and methods, a user can conveniently register and manage a content playback device, e.g., an IPTV, using voice commands rather than employing cumbersome devices or having to navigate to a separate registration website. In this way, registration may be accomplished more conveniently. After registration, additional follow-up features may be implemented, such as directly selecting the device for browsing, or inheritance of registration information or configurations of other devices associated with the user account.

Implementations of the system and method may employ a web form and web technologies that are compatible with devices and browsers to accept user input as well as server-side scripting languages. A speech engine may be employed at various locations to convert the voice input to textual or numerical data to register the IPTV, or indeed any network-enabled device. The speech engine may receive voice input in various ways, e.g., from a USB or assigned hardware port, from a microphone coupled to or embedded within a remote control, the IPTV or other device, second display, or the like. The recognized text may be displayed on the content playback device to the user to ensure accurate transcription. The recognized text, e.g., registration information, may then be automatically or manually submitted to a network provider.

In one example of a method of operation, when a content playback device is turned on and can communicate with the network, e.g., either in a wired or wireless fashion, a user is prompted to enter a network password if necessary and is then automatically directed to a registration portal. If the user lacks a user account with the registration portal, they may be prompted to create one. After the user logs into the registration portal, the user is prompted to add the content playback device's registration code or other identifiable codes, such as the MAC address. The user then speaks the code into the audio input device, either character-by-character or all at once. The interaction with the registration (or other administrative) portal may be entirely by way of voice or may occur via a combination of voice and manual entry using a remote control. Upon successful registration, the device may be ready for browsing and content selection. The user may also use a prior configuration to populate registration information of a new content playback device, e.g., to inherit information from the prior configuration, with only a need to add the new device's registration code.

The network-enabled content playback device can take many forms, and multiple content playback devices can be coupled to and selected within a given local network. Exemplary content playback devices may include IPTVs, DTVs, digital audio systems, Blu-ray® players, or more traditional video and audio systems that have been appropriately configured for connectivity. In video systems, the content playback device includes a processor controlling a video display to render content thereon.

In one aspect, the invention is directed towards a method of entering data to a network-enabled device, including: configuring a network-enabled device to be in a state to receive audio data, the data associated with a service affiliated with the network-enabled device, a server associated with the network-enabled device, or the operation of a user interface of the network-enabled device; receiving audio data; converting the received audio data to textual data; and causing the network-enabled device to perform an action based on the textual data, the textual data representing a function on the service or on the server, or representing an operation on the user interface of the network-enabled device.

Implementations of the invention may include one or more of the following. The received audio data may be registration data, and the method may further include associating the textual data with a user account, whereby the network-enabled device is registered to the user account.

The method may further include creating a user account based on registration data. The received audio data may be a username or password or both, and the function on the service may be to log in to a user account on the service. The received audio data may be a navigation command, and the performing an operation on the user interface may include performing the navigation command. The method may further include transmitting a signal to cause the network-enabled device to display the textual data. After the audio data is received and converted to textual data corresponding to a character, a textual version of the character may be displayed on the network-enabled device. The method may further include prompting the user to confirm the textual data. The method may further include storing the received audio data, and if following the displaying a prompt a user modifies the textual data, the method may further include associating the modified textual data with the received audio data. The method may further include: detecting a language type from the received audio data; if the detected language type does not correspond to one of the supported languages of the network-enabled device, then: performing the converting step such that the textual data is in a form corresponding to the detected language type; creating an image file of the textual data; and transmitting the image file to the network-enabled device for display. The method may further include: detecting a language type from the received audio data; if the detected language type does not correspond to one of the supported languages of the network-enabled device, then: performing the converting step such that the textual data is in a form corresponding to the detected language type; and transmitting the textual data to the network-enabled device for display. The method may further include: detecting a language type from the received audio data; if the detected language type does not correspond to one of the supported languages of the network-enabled device, then downloading a language module corresponding to the detected language type to the network-enabled device. The method may further include: prompting a user to enter a language type, and upon entry of the language type, downloading a language module corresponding to the entered language type to the network-enabled device.

In another aspect, the invention is directed towards a non-transitory computer-readable medium, including instructions for causing a computing device to implement the above method.

In another aspect, the invention is directed towards a method of entering data for a network-enabled device, including: configuring a network-enabled device to be in a state to receive audio data; receiving audio data; converting the received audio data to textual data; and causing the network-enabled device to perform an action based on the request using the textual data.

Implementations of the invention may include one or more of the following. The requesting an input of data may include displaying a form and prompting for the input of data, and the method may further include populating the form with the textual data and displaying the populated form. The form may prompt for input of a registration code, and the method may further include transmitting the textual data to a server to perform a registration, and upon receipt of a signal indicating a successful registration from the server, displaying an indication of the successful registration. The requesting an input of data may include accepting an input of a navigational command. The receiving audio data may include receiving audio data using an input port on the network-enabled device. The converting the received audio data to textual data may be performed on the network-enabled device. The method may further include: prior to the converting, determining the received audio data is in a non-supported language; and downloading a language module corresponding to a language of the received audio data. The input port may be configured to accept audio data or an audio stream from a mobile phone, tablet computer, laptop computer, microphone, or may be a USB port. A dongle may be coupled to the USB port, and the receiving audio data may be performed by a microphone coupled to the dongle. The converting the received audio data to textual data may be performed in the dongle. The receiving audio data may include receiving audio data from a remote control. The converting the received audio data to textual data may be performed on the remote control or on the network-enabled device. The receiving audio data may include receiving audio data from a second display, e.g., where the second display is a smart phone, a tablet computer, or laptop. The converting the received audio data to textual data may be performed on the second display or on the network-enabled device. The receiving audio data may include receiving audio data using a radio frequency audio input device which has been paired with the network-enabled device, e.g., where the radio frequency audio input device is a smart phone. The converting the received audio data to textual data may be performed on the radio frequency audio input device.

In another aspect, the invention is directed towards a non-transitory computer-readable medium, including instructions for causing a computing device to implement the above method.

In yet another aspect, the invention is directed towards a method of entering data for a network-enabled device including: configuring a network-enabled device to be in a state to receive audio data; receiving audio data; receiving an indication of a language type; determining that the language type is unsupported; transmitting the received audio data to a first server; receiving converted data from the first server, the converted data calculated from the received audio data; and displaying an indication of the received converted data.

Implementations of the invention may include one or more of the following. The received audio data may correspond to a navigational command, and the displaying an indication of the received converted data may include performing the navigational command. The received audio data may correspond to data to be entered into a form, and the displaying an indication of the received converted data may include entering the data into the form. The receiving an indication of a language type may include: receiving a selection of a language type; determining a language type from a settings file; detecting a language type based on the received audio data; or transmitting the audio data to a second server, and receiving an indication of the language type from the second server. The received converted data may be textual data, or may be an image file indicating textual data.

In yet another aspect, the invention is directed towards a method of entering data for a network-enabled device including: configuring a network-enabled device to be in a state to receive audio data; receiving audio data; receiving an indication of a language type; determining that the language type is unsupported; transmitting a request for a language module corresponding to the language type to a server; receiving the requested language module from the server; using the received language module to convert the audio data to textual data; and displaying an indication of the textual data.

Implementations of the invention may include one or more of the following. The language module may be stored on the network-enabled device, on a dongle connected to the network-enabled device, or on an external device in communication with the network-enabled device. The receiving an indication of the language type may include: receiving a selection of a language type; determining a language type from a settings file; detecting a language type based on the received audio data; or transmitting the audio data to a second server, and receiving an indication of the language type from the second server.

In another aspect, the invention is directed towards a dongle device adapted to be placed in signal communication with a network-enabled device, including: means for receiving an audio file; means for converting the audio file to a textual file; and output means for transmitting the textual file to a network-enabled device.

Implementations of the invention may include one or more of the following. The receiving means may be selected from the group consisting of: an RF signal receiver, a microphone, and a hardware port. The output means may be selected from the group consisting of: a USB port, an RF signal transmitter, and a hardware port. The device may further include memory for storing a user profile, the user profile indicating audio characteristics of a user's voice.

Advantages of certain embodiments of the invention may include one or more of the following. Content playback and other network-enabled devices may be conveniently registered with a user account and managed using the system and method. The registration may employ a voice recognition system with little or no additional hardware expense. Voice recognition systems may be employed to enter numerous types of data into a network-enabled device. The voice recognition system may allow speakers of unsupported languages to control their devices using their native language. Software operating network-enabled devices may be simplified by eliminating the need for multiple language sets to be shipped with each device—only one or in some cases none need be provided. Other advantages will be apparent from the description that follows, including the figures and claims.

BRIEF DESCRIPTION OF THE DRAWINGS

FIG. 14 illustrates an exemplary computing environment, e.g., that of the disclosed second display, server, smart phone, mobile device, tablet computer, dongle or the like.

Like reference numerals denote like elements throughout.

DETAILED DESCRIPTION

Figure 1:
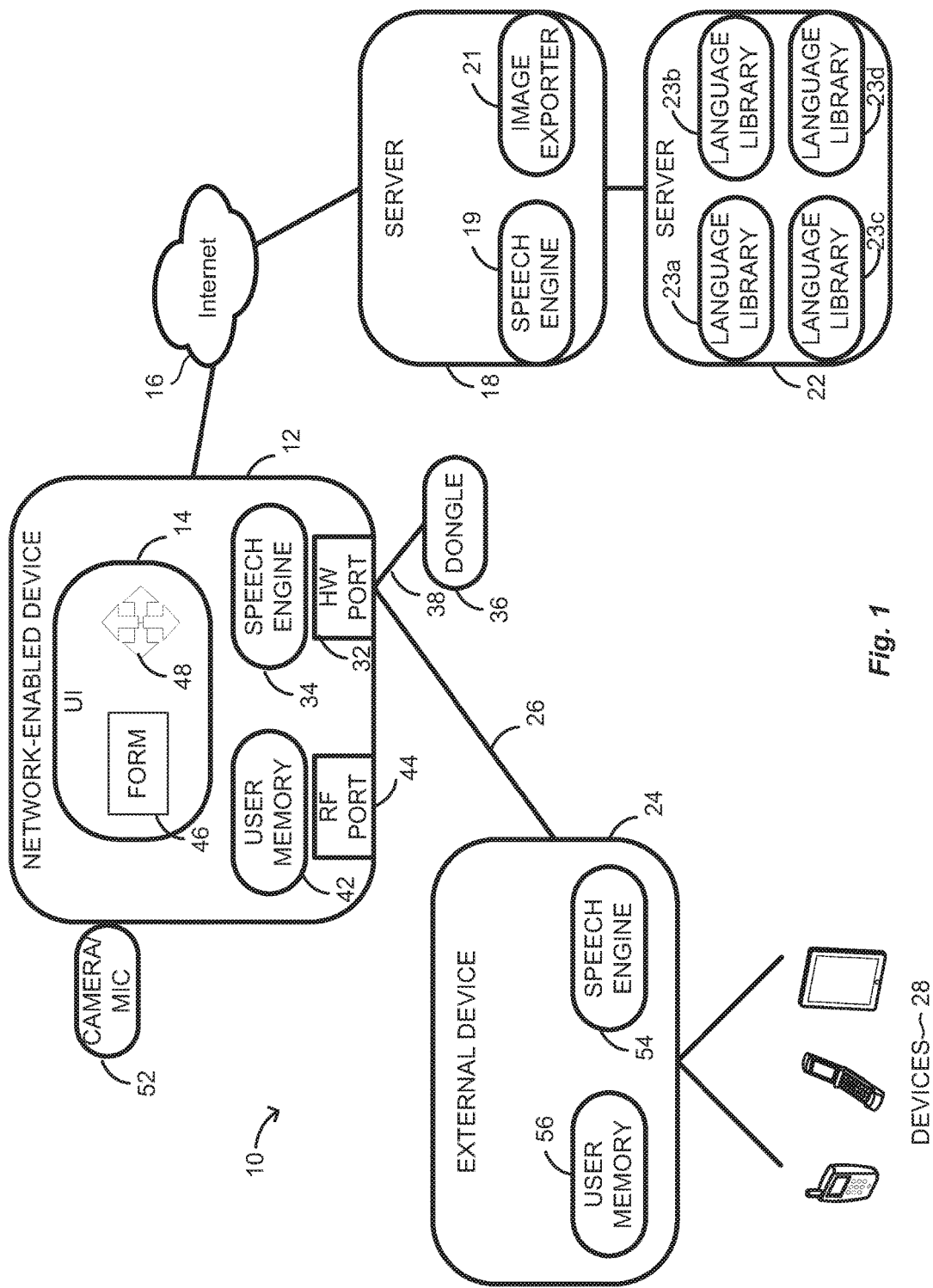
FIG. 1 is a block diagram of an exemplary system in accordance with one implementation of the present principles.

FIG. 1 is a block diagram of an exemplary system 10 in accordance with one implementation of the present principles. In this system 10, a network-enabled device 12 is connected to a server 18 through the Internet 16. The network-enabled device 12 is generally an IPTV, media player, Blu-ray® player, or the like, and has a user interface 14 in which data may be entered as well as displayed, e.g., on a form 46. The user interface 14 may enable navigational commands to allow a user to move around different forms or to select different entries, the navigational commands shown schematically by arrows 48.

The system 10 may allow a degree of interaction with a user by way of the user's voice. In so doing, the network-enabled device 12 may incorporate a speech engine 34, e.g., implemented in hardware or software, where audio data is entered by way of a hardware port 32, an RF port 44, e.g., to enable transmissions by Bluetooth® protocols, or via other means. One such other means may be a camera with a microphone 52, either embedded within the network-enabled device 12 or coupled thereto.

The network-enabled device may include user memory 42 to store commonly used commands by the user, as audio files or an equivalent, such that the network-enabled device may over time "learn" how the user delivers commands. For example, if the user has a substantial accent or dialect, the user memory may store a record of commands along with subsequent actions performed, and may learn to associate actions with the voice command in the native dialect or accent. In some cases, if the system cannot understand a user, it may prompt the user to read a short passage to allow a degree of learning to take place. The user memory 42 may also store records of not only voice commands but also what the user, after editing the text, determined was the correct conversion of the audio data.

Other ways may also be employed to enable the network-enabled device to obtain audio data. For example, a dongle 36 may be coupled to a port on the device 12 via a connection 38. The dongle 36 may include a microphone, a user memory for storing data, e.g., information about a user's dialect, accent, or speech patterns, and even a speech engine. These are not shown in the figure for clarity. The dongle 36 may, e.g., be attached to a USB or other port on the TV or may connect wirelessly. In such a system, the dongle may be transported from device to device, affording the system 10 a degree of flexibility.

An external device 24 may also be employed to provide voice input. The external device 24 may incorporate a speech engine 54 to accomplish the functions of speech engine 34, or the two may work together to convert audio data to textual data. A user memory 56 may be employed for the same or similar reasons as the user memory 42. Typical external devices 24 may include those shown as devices 28, e.g., smartphones, tablets, laptops, or the like. Such may communicate with the network-enabled device via RF, infrared, a wired link, or the like. Other external devices 24 may include a second display, which interacts with the network-enabled device using a proxy server as described in the application incorporated by reference herein.

It will be understood that where the speech engine 34 or 54 is employed, conversion of audio data to textual data takes place on the client side. In some cases, audio data may be transmitted to the server 18 for conversion, in which case a speech engine 19 may be employed to convert the speech. Server-side processing affords certain benefits, including scalability of computing power and the like. In addition, it is noted that while connections with the server entail steps such as arranging the necessary connectivity, where the purpose of voice input is to, e.g., perform registration of the device 12, then the inconvenience to the user is minimized since such procedures are generally performed once and not again. The server 18 may also incorporate an image exporter 21, which may be employed to create images of textual data where the textual data is of a language type unsupported by the device 12. That is, an image may be made of the textual data, and the image sent for display on the user interface 14. Further, to enable an array of languages to be treated, a language server 22 may employ a number of language libraries 23a-23d, where each language library addresses a different language, e.g., Chinese, Korean, Japanese, and the like.

Wherever the speech engine is located, a nominal system may simply have audio data for the alphabet and numbers stored, as opposed to complicated commands or username/password combinations. In this way, a network-enabled device may simply have enough memory to store audio files for the alphabet and numbers, as well as some simple commands such as "up", "down", "next", "page down", a name of a service or social networking site, and the like. Any other entries may simply be entered by the user as a string of characters. In some cases, a character may be voiced by the user, the same converted to text, and the same displayed character-by-character as textual data on the screen, e.g., in a form. In other cases, a user may say a string of characters, which is then sent for conversion as a single audio file.

Figure 2:
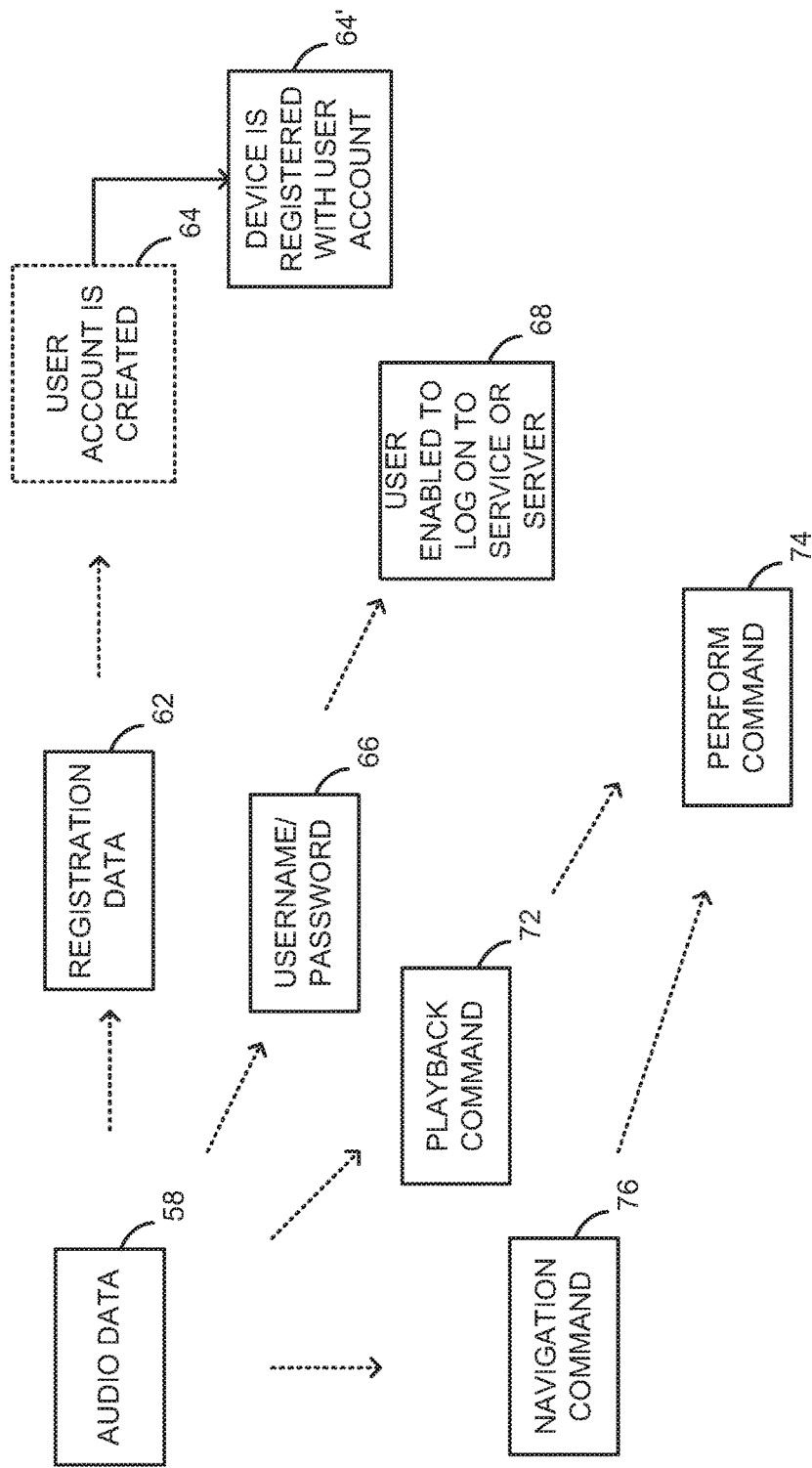
FIG. 2 is a diagram illustrating various types of audio data and their purposes.

FIG. 2 is a diagram illustrating various types of audio data and their purposes. For example, the audio data 58 may correspond to registration data 62 through which a step may be performed of registering a device with a user account (step 64'). If necessary a user account may be created first (step 64). One of ordinary skill in the art will understand that the same systems and methods may apply to inserting other types of administrative or other data in a web form, native application, or other such for control of a network-enabled device. The audio data 58 may also correspond to user names or passwords 66, which in turn may enable a user to log in to a service or to a server (step 68). For example, a user may say "username" and "password" in order to log in to their account at Netflix®. The audio data 58 may further correspond to a playback command 72 or to a navigation command 76. In either case a result may be to perform the command (step 74). The playback command 72 may pertain to trick play of a stored audiovisual file such as a movie or television program, and the navigation command 76 may correspond to moving a cursor or highlight around on a menu or other interactive screen on the user interface of the network-enabled device.

Figure 3:
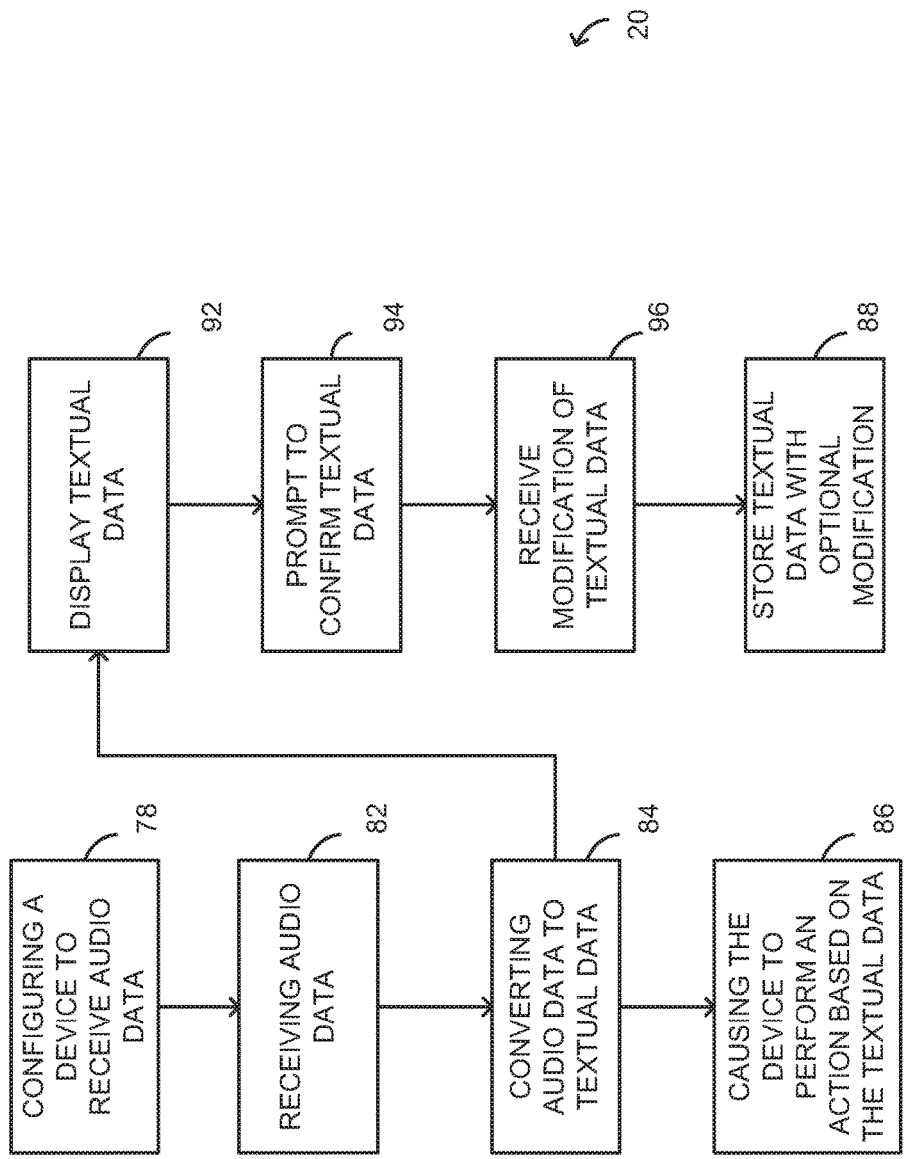
FIG. 3 is a flowchart illustrating an exemplary method according to an implementation of the present principles.

FIG. 3 is a flowchart 20 illustrating an exemplary method according to an implementation of the present principles. A first step in FIG. 3 is configuring a device to receive audio data (step 78). This step simply entails making the network-enabled device ready to receive sound commands, e.g., either through an embedded microphone or by receiving audio data from an external device, e.g., either recorded on the external device for using the external device as a conduit for audio data.

Following the configuration steps, a next step is to receive the audio data (step 82). Such audio data may generally be stored in a buffer or in a memory of the device or external device. The audio data is then converted to textual data (step 84). As noted with respect to FIG. 1, conversion may occur on the client side, on the server side, or an algorithm may allow partial processing on both sides. In some cases the network-enabled device is caused to perform an action based on the textual data (step 86). The action performed may be minimal, e.g., simply displaying the textual data calculated from the audio data. The action may also be more significant, such as causing the network-enabled device to call up a favorites list on a service, play a video, or the like.

Where the textual data is, e.g., data for a form, the textual data may be displayed on the device (step 92). A user may be prompted to confirm an accurate conversion of the textual data (step 94), e.g., via a visual or auditory prompt. In some cases, modification of the textual data may be performed (step 96). An indication may be displayed of a successful conversion of the textual data as well as its usage, e.g., displaying that registration was successful. The textual data may then be stored with the optional modification (step 88). Storage of the textual data may be in a user memory, and may be for the reasons described above, e.g., learning of the application to become more attuned to the user's voice.

Figure 4:
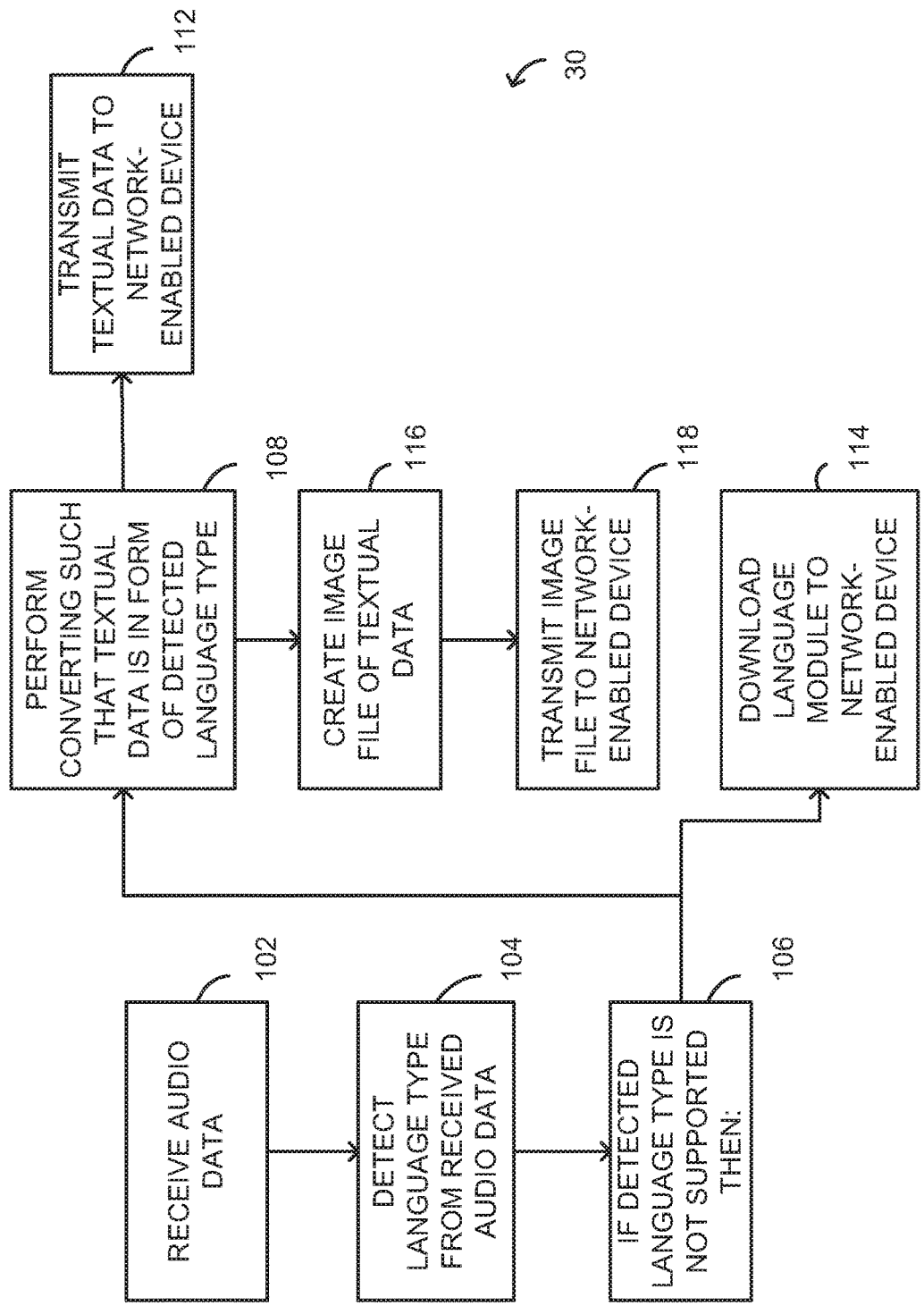
FIG. 4 is a flowchart illustrating an exemplary method according to another implementation of the present principles, where voice input of an unsupported language is treated.

FIG. 4 is a flowchart 30 illustrating an exemplary method according to another implementation of the present principles, in particular, in which a step of language translation is performed where a user's native language is not supported by the network-enabled device. A first step of FIG. 4 may be similar to that of FIG. 3, in which a device is configured to receive audio data. Audio data is then received by the server (step 102). A language type may be detected from the received audio data (step 104). Such detection may occur in a number of ways as described below. If the detected language type is not supported by the network-enabled device, then a conversion and translation may occur of the audio data such that it is converted to textual format and translated to a form appropriate to the detected language type (step 108). In some cases, the language type is unsupported but the text of the language may be capable of being displayed by the network-enabled device. In this case, the textual data may be transmitted for display to the network-enabled device (step 112). In another case, where the textual data is not capable of being displayed, an image file may be created of the textual data (step 116), and the same transmitted to the network-enabled device for display as an image file (step 118). In yet another alternative implementation, a language module may be downloaded to the network-enabled device to enable the same to convert and translate the audio data locally (step 114).

Figure 5:
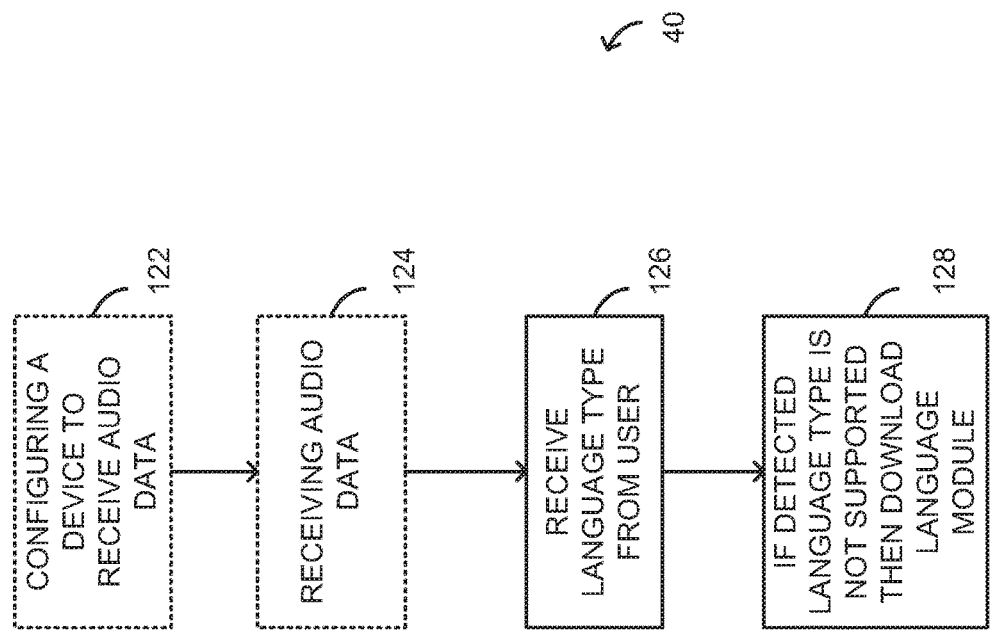
FIG. 5 is a flowchart illustrating an exemplary method according to yet another implementation of the present principles, where a language module is downloaded.

FIG. 5 is a flowchart 40 illustrating an exemplary method according to yet another implementation of the present principles, but where the downloading of a language module allows voice recognition to occur locally rather than on a server. A first step is, as before, configuring a device to receive audio data (step 122) and receiving audio data (step 124), but in this case a language type is received as selected by a user (step 126). For example, a new TV may be turned on and, with no prior input from a user, may display a menu of options prompting the user to choose a language. The user may navigate to a selected language using a remote control or using voice commands, so long as a "base" set of commands are loaded into the TV originally, e.g., at least words for "down", "up", "next", "select" and the like.

Once a language has been selected, if the language type is not supported innately or natively by the TV, the same may download a language module pertaining to the language type to allow voice recognition to occur in that language (step 128).

Figure 6:
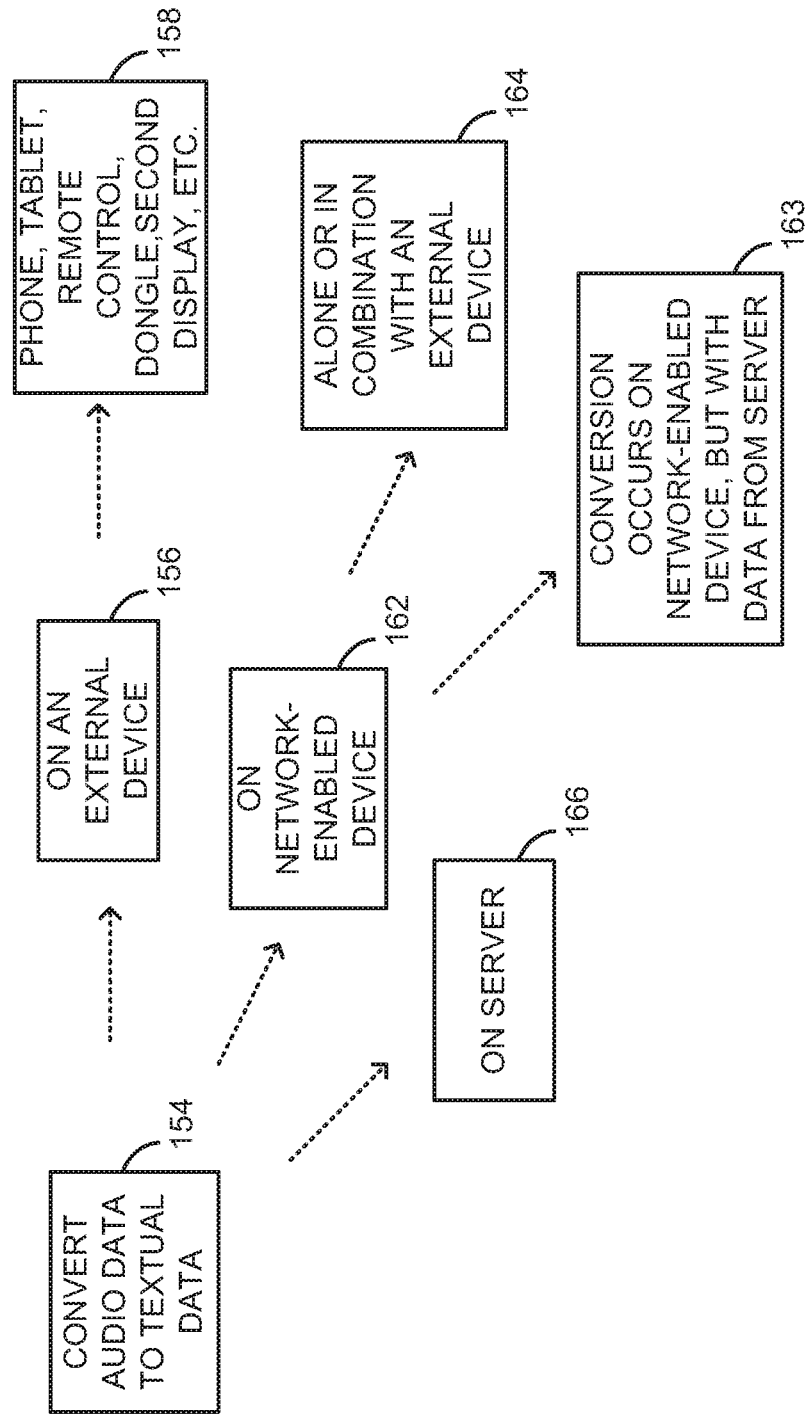
FIG. 6 is a diagram illustrating ways and means of converting audio data to textual data.

FIG. 6 is a diagram illustrating ways and means of converting audio data to textual data. For example, the step of converting audio data to textual data (step 154) may be performed on an external device (step 156), e.g., on a phone, tablet, remote control, second display, dongle, or the like (step 158). The conversion may also occur on the network-enabled device (step 162), either alone or in combination with an external device (step 164). Alternatively, the conversion may occur on the network enabled device, but based on language-specific data from the server. In this implementation, the network-enabled device may not have initially had the data necessary to convert the language spoken by the user, but the device may download the language-specific data from a server to enable the conversion. Finally, the conversion may also take place on the server (166). It will be understood that in some cases multiple speech engines may convert portions of the received audio data, and in such cases the responsibility for converting the audio data to textual data is shared by the different modules.

Figure 7:
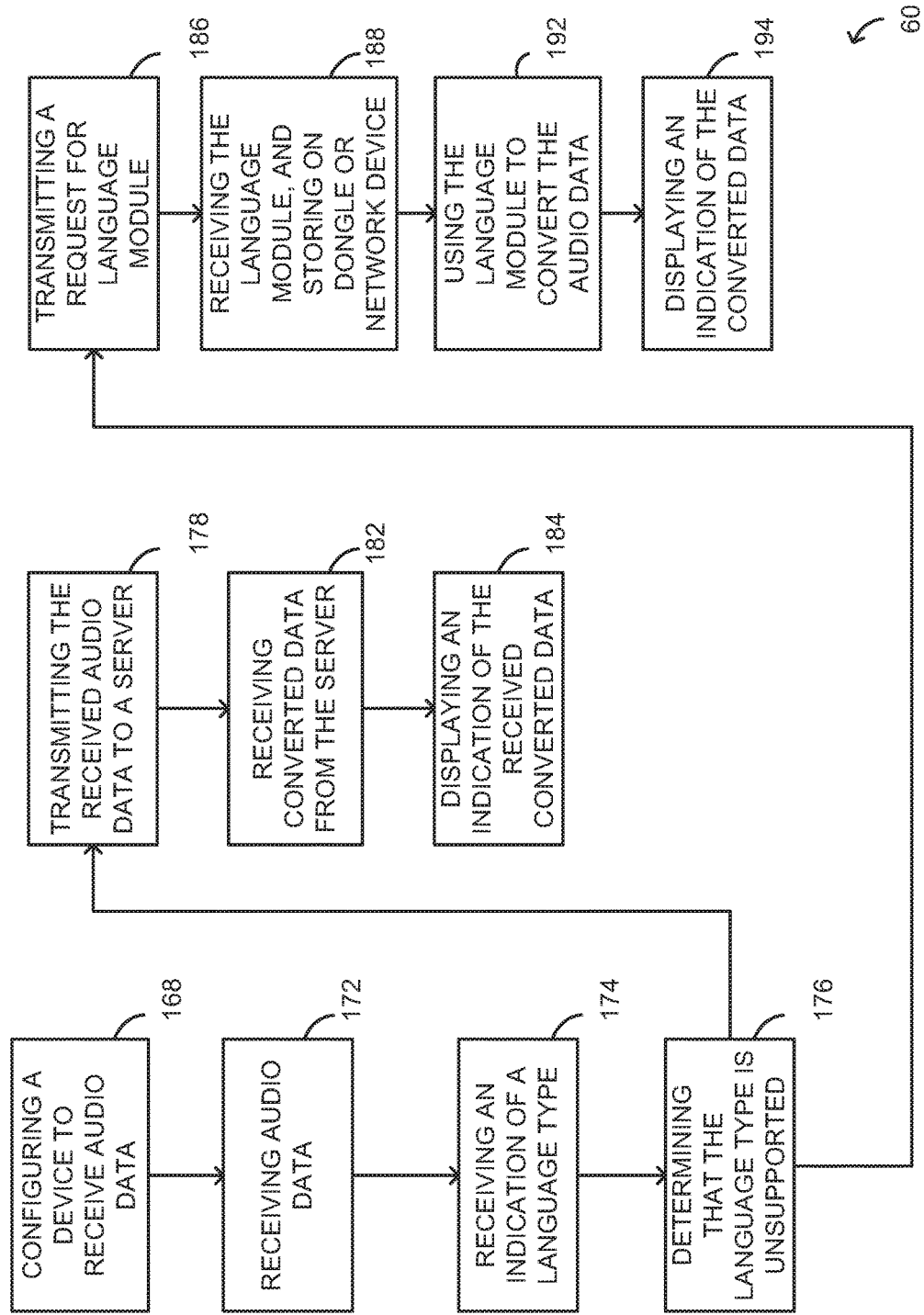
FIG. 7 is a flowchart illustrating an exemplary method according to another implementation of the present principles, including two ways of treating use cases of unsupported languages.

FIG. 7 is a flowchart 60 illustrating a more detailed method according to another implementation of the present principles. As before, a device is configured to receive audio data (step 168), and audio data is received (step 172). An indication is received of a language type (step 174). Such indication may be by various methods described herein and in FIG. 8. Upon a determination that the language type is unsupported by the network-enabled device (step 176), various sets of steps may be taken. In a first set, the received audio data may be transmitted to a server (step 178). This server may convert the received audio data to textual format, and transmit the same back to the network-enabled device (step 182) for display (step 184).

In an alternative implementation, following a determination that the language type is unsupported, a request may be transmitted for a language module corresponding to the language type (step 186). The language module may be received, and stored on the network device or on an external device, e.g., a second display, dongle, smart phone, tablet, or the like (step 188). The language module may then be employed to convert the audio data to textual data (step 192), and an indication may be displayed of the converted data (step 194). For example, the textual data itself may be displayed such that the user can confirm accurate entry and conversion.

Figure 8:
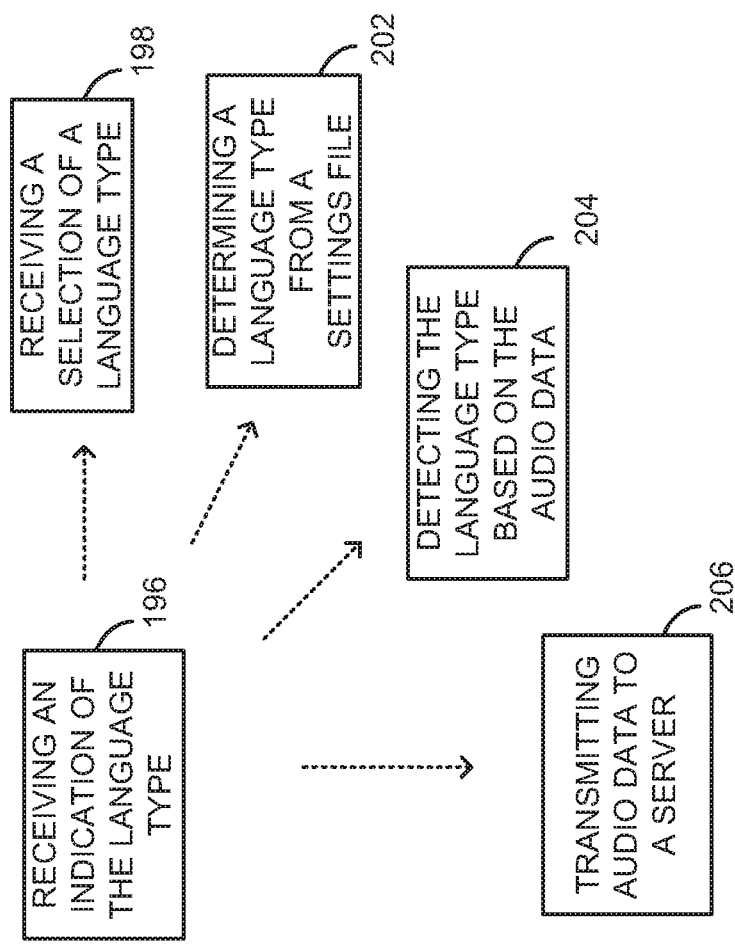
FIG. 8 is a diagram illustrating ways of receiving an indication of a language type.

FIG. 8 is a diagram illustrating ways of receiving an indication of a language type (step 196). For example, the system may receive a selection of a language type from a user (step 198), e.g., from a selection on a menu. In another implementation, a language type may be determined from a settings file (step 202). The language type may also be detected based on the audio data (step 204). In such systems, the audio file itself is employed and analyzed on the client side to determine the language type, or a likely language type, spoken by the user. In yet another implementation, the audio data may be transmitted to a server for such analysis (step 206).

Figure 9:
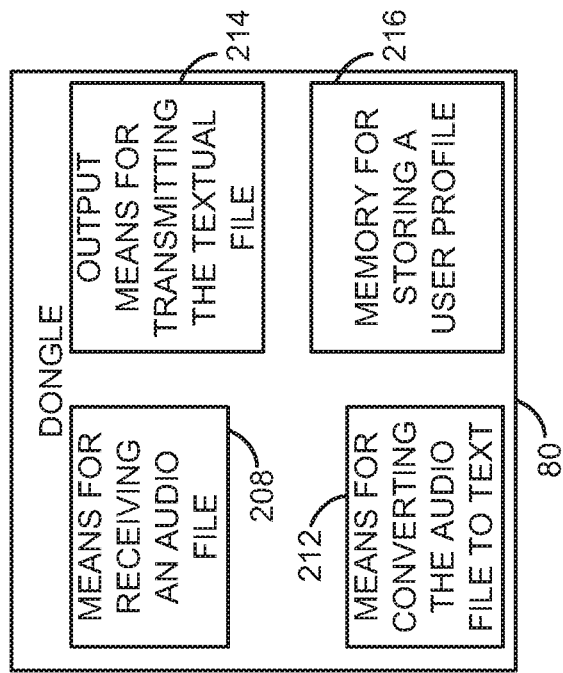
FIG. 9 is a diagram illustrating an exemplary implementation of a dongle according to present principles.
Figure 10:
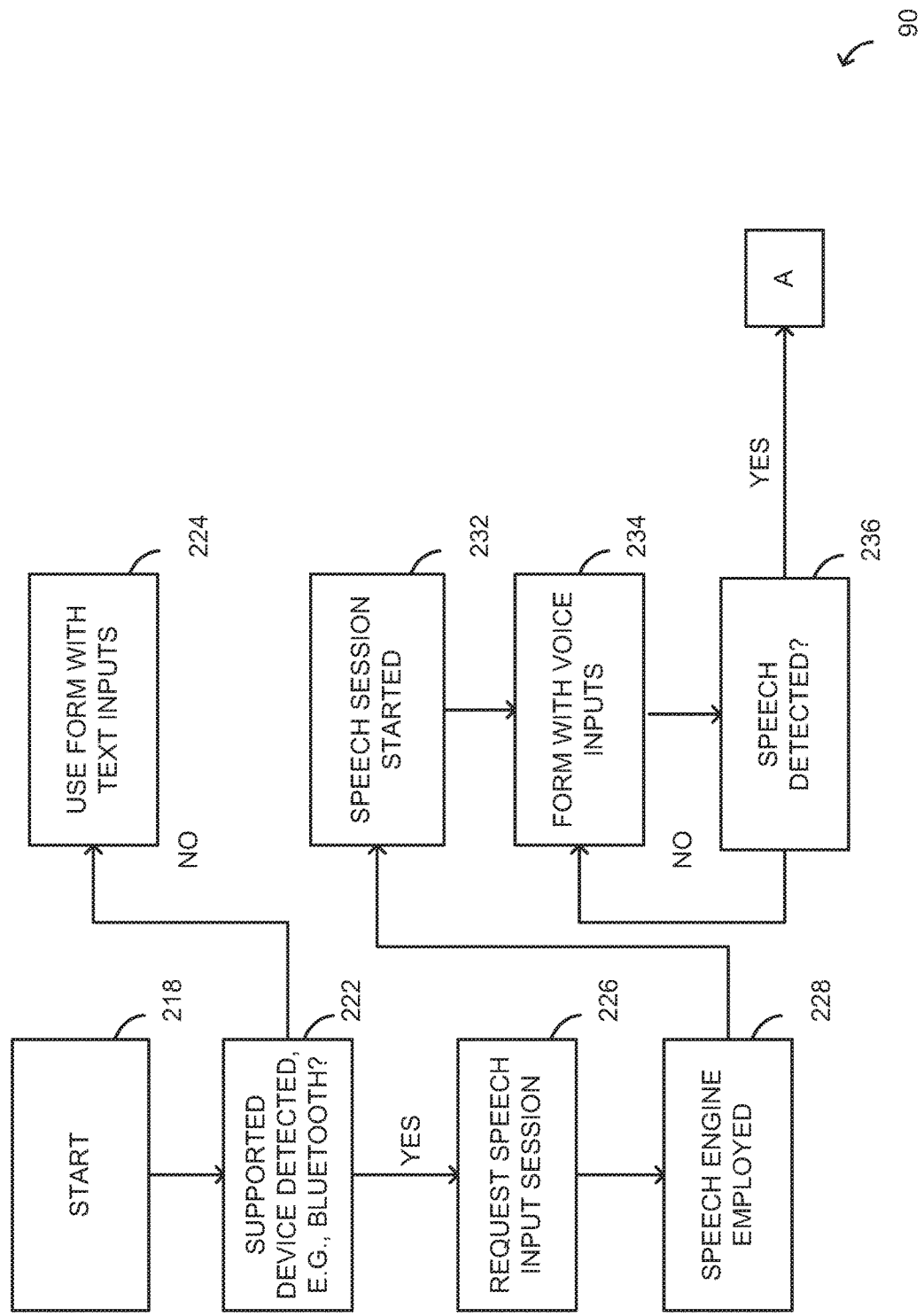
FIGS. 10-13 are sequential flowcharts illustrating a specific but exemplary method according to present principles.
Figure 11:
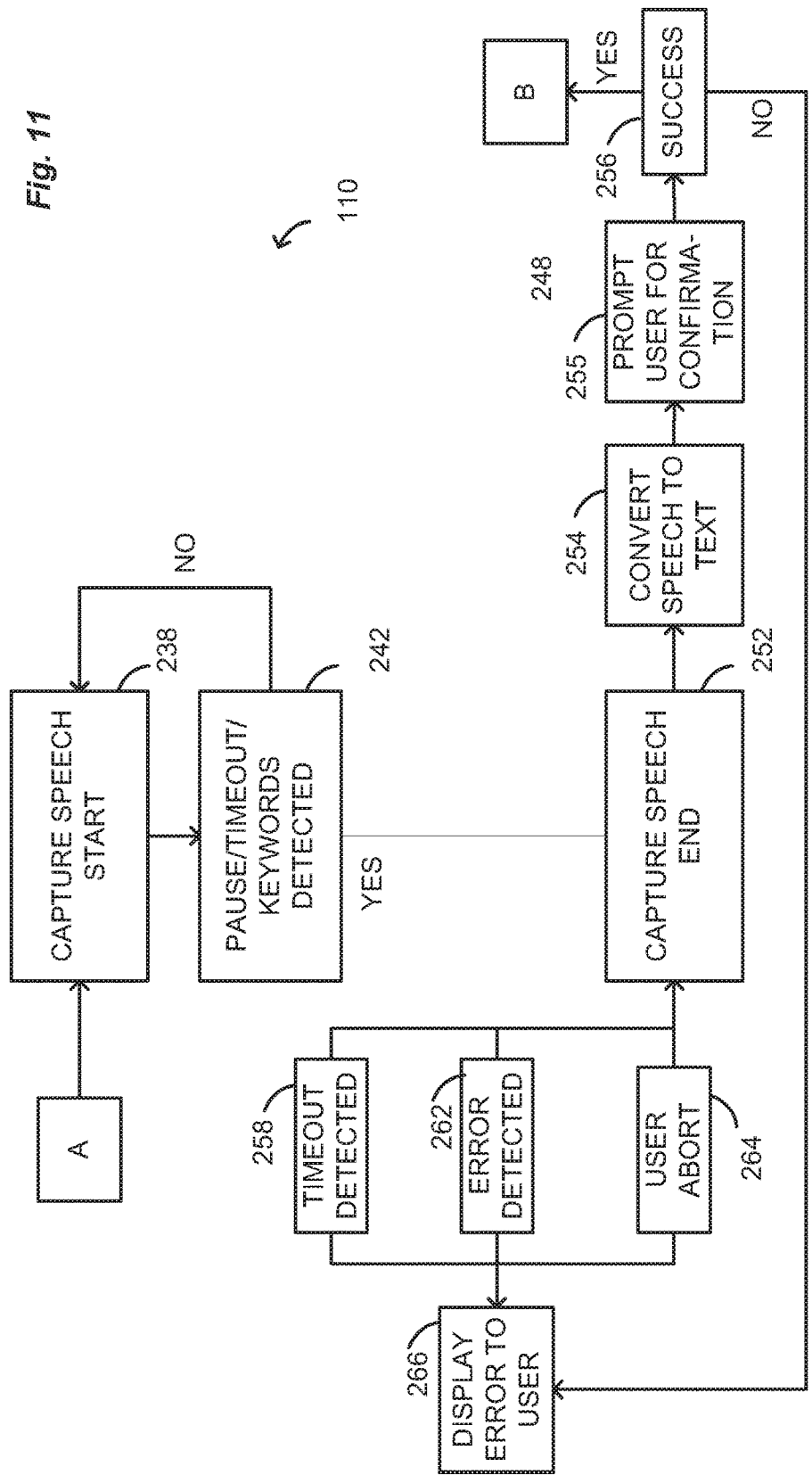
Figure 12:
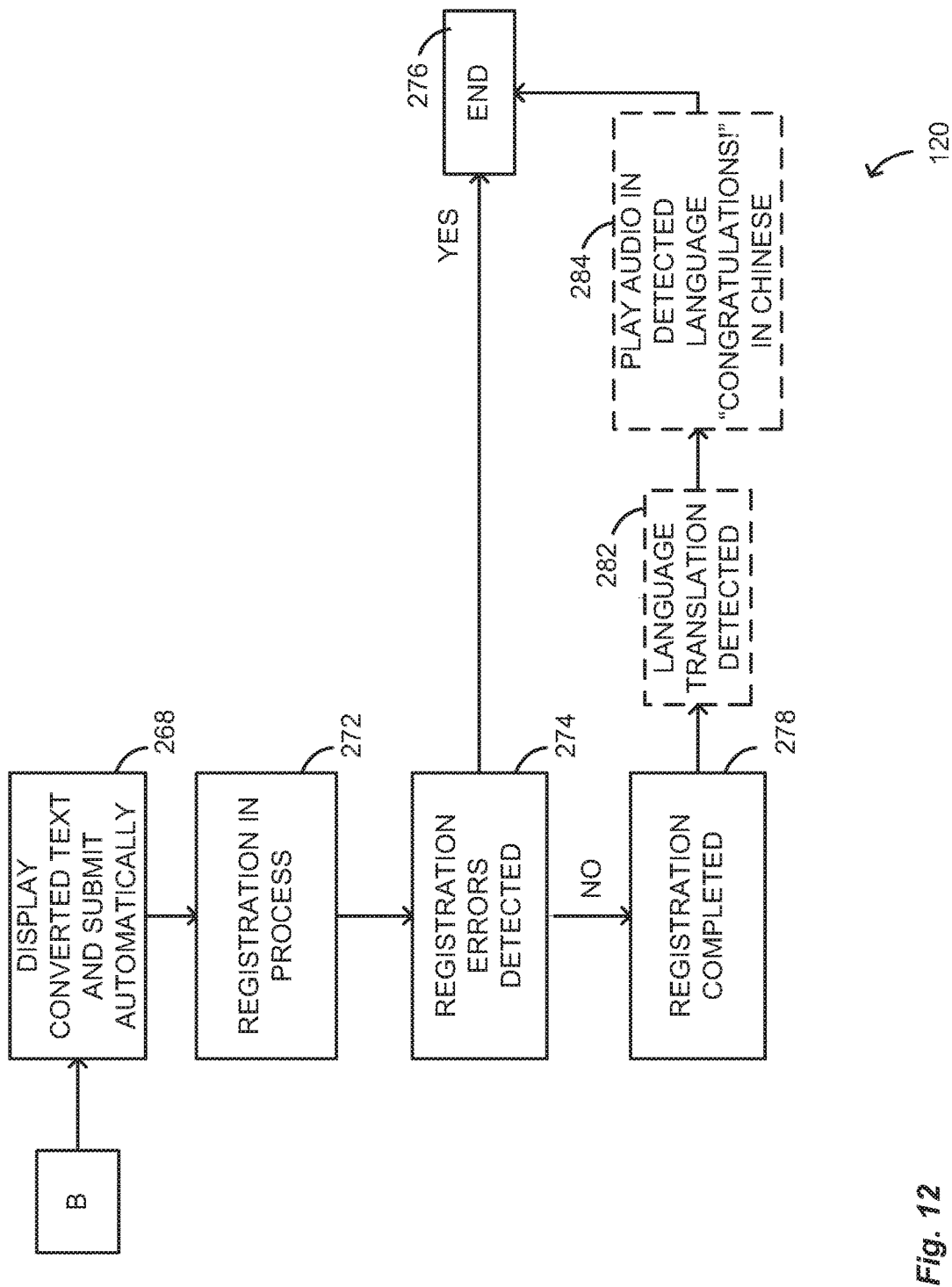

FIG. 9 is a diagram illustrating an exemplary implementation of a dongle 80 according to present principles. The dongle 80 includes means 208 for receiving an audio file. Such means 208 may include a microphone embedded or coupled to the dongle, a hardware port to receive an audio file, e.g., from the network-enabled device, or the like. Where the means 208 includes a hardware port to receive an audio file from the network-enabled device, such may allow a dongle without a microphone to convert audio data that the network-enabled device receives from its own microphone or from some other source. The dongle 80 further includes means 212 for converting the audio file to text. The means 212 generally provides a speech engine functionality to the dongle 80. In some implementations, the means 212 is situated on the network-enabled device rather than the dongle, or the two may share performance and responsibility of the functions. The dongle 80 further includes output means 214 for transmitting the textual file to the network-enabled device. Such means 214 may be employed to provide data necessary for the network-enabled device to display a converted audio file, and the means may include a hardware port or a port such as for RF communications. The dongle 80 further includes memory 216 for storing a user profile or other user data. The memory 214 may store information about user accents, dialects, or the like, as well as provide custom language translation functionality. It is noted that means 208-214 and memory 216, or portions thereof, may be generally implemented as non-transitory computer-readable media.

FIGS. 10-13 are flowcharts illustrating one or more specific methods according to implementations of the present principles. Referring to the flowchart 90 of FIG. 10, after the method starts (step 218), a step may be employed of determining if a supported device is detected (step 222). For example, if a device is ready that communicates via an RF communications scheme with the network-enabled device, e.g., via Bluetooth®. If no supported device is detected, a form may be filled using text inputs (step 224), e.g., using a keyboard or remote control.

If the supported device is detected, a speech input session may be requested (step 226), e.g., via methods described above, such as by clicking an icon or saying a keyword. The speech engine is instantiated if necessary (step 228), and a speech session is started (step 232). The speech engine may vary, and it is noted that the same may be available via Google®, Microsoft®, Sony®, via open source software, and so on.

The form (or other Web or browser action performed) may then be filled out using voice inputs (step 234). If speech is detected (step 236), the flow moves on to the flowchart 110 of FIG. 11. If no speech is detected, the system may wait until a timeout occurs. Once speech is detected, a step of capturing the speech may start (step 238). The same may continue until a pause occurs, a timeout, a particular keyword is detected (step 242), or the user indicates in another fashion that the speech capture should end (step 252). It is noted that the speech capture may be of a phrase, a word, an individual letter or number, or the like.

Other aspects may also cause the speech capture to end, such as if a timeout is detected (step 258), if an error is detected (step 262), or if a user aborts the speech capture (step 264). In either case, an error may be displayed to the user (step 266).

Assuming some speech has been captured, the speech engine may be employed for voice conversion (step 254). The user may be prompted to confirm the converted text (step 255). Assuming the conversion completes properly, the system may report success (step 256). If not, an error may be displayed to the user (step 266).

Assuming the synthesis proceeds properly, and the audio file is successfully converted to a textual file, the text may be displayed and submitted automatically (step 268). It will be understood that non-automatic submissions, e.g., those requiring user confirmation, are also contemplated within the system and method. In the case of employing voice recognition to perform registration, the registration process may continue (step 272). It will be understood that other administrative functions will proceed similarly. If registration errors are detected (step 274), the method may end (step 276). If no errors are detected, the registration may complete (step 278). If a language type has been detected (step 282), a step may be performed of playing an audio "congratulations" or other message to the user in the detected language type. It will be understood that other such audio cues may be provided to the user in their native or chosen language for other purposes.

Figure 13:
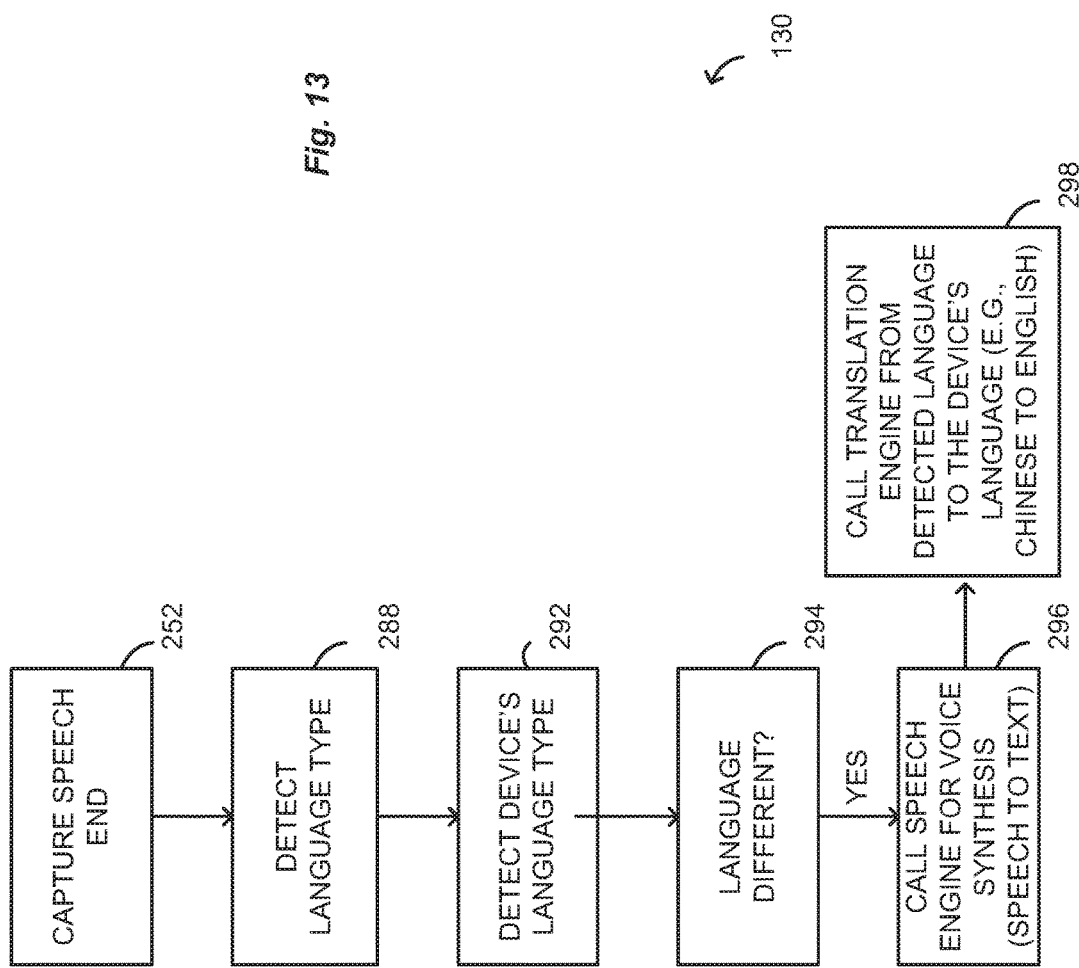

In the flowchart 130 of FIG. 13, additional details are given of a method for treating unsupported languages. In particular, following a step of ending the capture of speech (step 252), a language type may be detected (step 288). This step may be performed in a number of ways as described above. A step of detecting the supported languages of the device may also be performed (step 292). If it is determined that the languages are different, (step 294), a speech engine may be called for voice synthesis (step 296). A translation engine may also be called to enable translations from the detected language to the device's supported language, e.g., from Chinese to English, to enable input and control from the user's native or chosen language (step 298). In this fashion, a user may enter data, text, and commands via voice, in their native or chosen language, and have the equivalent text or commands be entered into the device.

Systems and methods have been disclosed that allow improvement of the user experience of the IPTV without adding to the hardware costs of the unit. As disclosed above, users may use the system and method to control and manage, e.g., register or perform other functions, content playback devices such as IPTVs using voice commands. The systems and methods allow network-enabled devices in some implementations to overcome inherent deficiencies, e.g., to solve the problem of unsupported languages.

Figure 14:
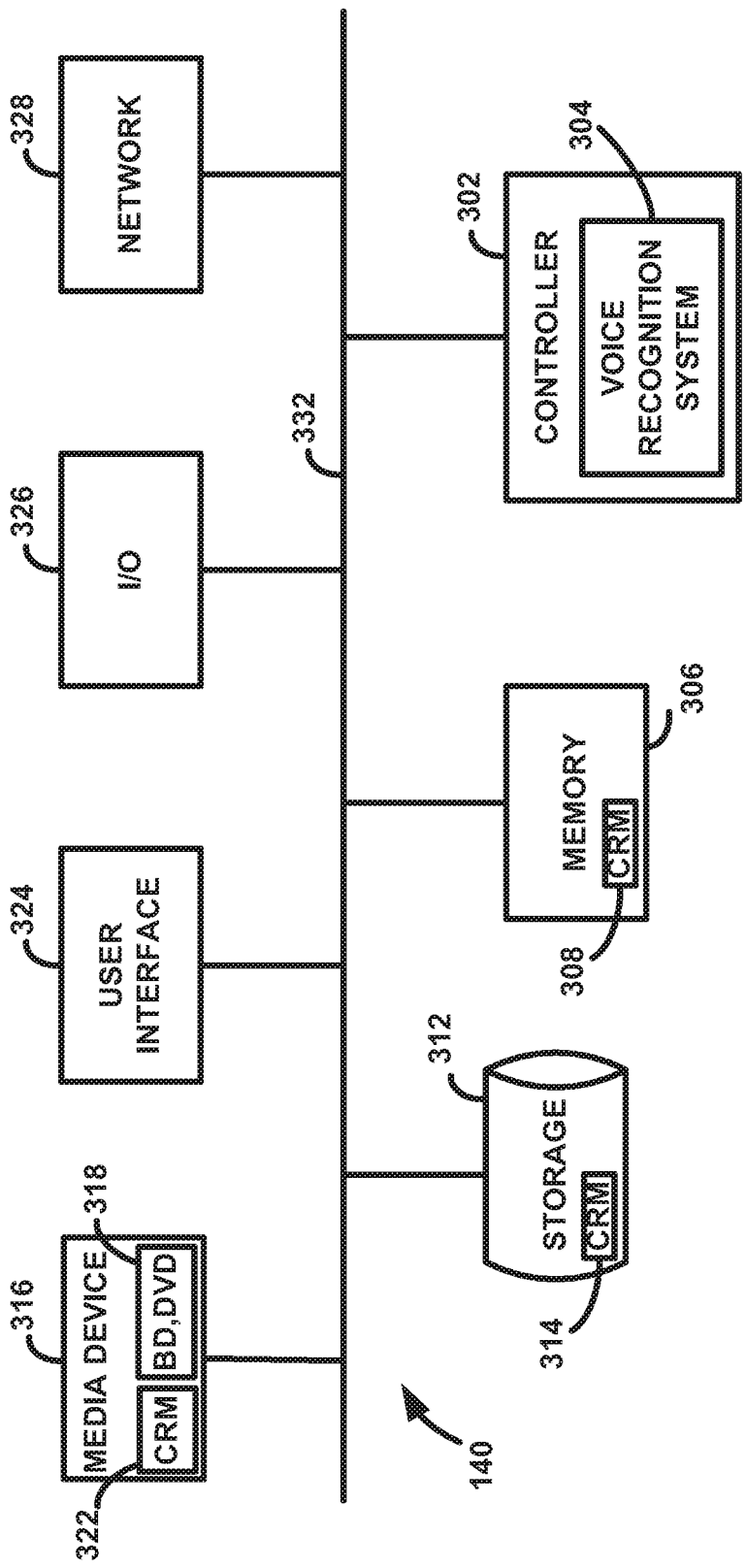

One implementation includes one or more programmable processors and corresponding computing system components to store and execute computer instructions, such as to execute the code that provides the speech engine, user interface, or network functionality. Referring to FIG. 14, a representation of an exemplary computing environment that may be employed is illustrated.

The computing environment includes a controller 302, a memory 306, storage 312, a media device 316, a user interface 324, an input/output (I/O) interface 326, and a network interface 328. The components are interconnected by a common bus 332. Alternatively, different connection configurations can be used, such as a star pattern with the controller at the center.

The controller 302 includes a programmable processor and controls the operation of the systems and their components for a voice recognition system 304. The controller 302 loads instructions from the memory 306 or an embedded controller memory (not shown) and executes these instructions to control the system. In its execution, the controller 302 may provide the voice recognition system as, in part, a software system. Alternatively, this service can be implemented as separate modular components in the controller 302 or the second display.

Memory 306, which may include non-transitory computer-readable memory 308, stores data temporarily for use by the other components of the system. In one implementation, memory 306 is implemented as RAM. In other implementations, memory 306 also includes long-term or permanent memory, such as flash memory and/or ROM.

Storage 312, which may include non-transitory computer-readable memory 314, stores data temporarily or long-term for use by other components of the system and method, such as for storing data used by the system. In one implementation, storage 312 is a hard disc drive or a solid state drive.

The media device 316, which may include non-transitory computer-readable memory 322, receives removable media and reads and/or writes data to the inserted media. In one implementation, the media device 316 is an optical disc drive or disc burner, e.g., a writable Blu-ray® disc drive 318.

The user interface 324 includes components for accepting user input, e.g., the content playback device registration information, from the user of the second display, and presenting information to the user. In one implementation, the user interface 324 includes a keyboard, a mouse, audio speakers, and a display. The controller 302 uses input from the user to adjust the operation of the system.

The I/O interface 326 includes one or more I/O ports to connect to corresponding I/O devices, such as external storage or supplemental devices, e.g., a printer or a PDA. In one implementation, the ports of the I/O interface 326 include ports such as: USB ports, PCMCIA ports, serial ports, and/or parallel ports. In another implementation, the I/O interface 326 includes a wireless interface for wireless communication with external devices. These I/O interfaces may be employed to connect to one or more content playback devices.

The network interface 328 allows connections with the local network and optionally with external devices and includes a wired and/or wireless network connection, such as an RJ-45 or Ethernet connection or "WiFi" interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention. For example, the voice input may be received by an application running on the second display. In this case the operation of the second display and its interaction with the content playback device and network provider may be as described in the patent applications Incorporated by reference above.

The user may also employ voice input to perform various functions, e.g., browser functions, such as browsing or searching services and assets as well as conducting transactions like video rentals or home shopping purchases. The user may also employ voice input and recognition to perform various affiliation functions with services. The user may also request and control content items to be played back using voice recognition. The device voice registration may extend to registering devices that not only display or render content items, but also store and play back the same, e.g., DVRs, Blu-ray® players, media players, game consoles, or indeed any network-enabled devices. While a full registration website may be primarily mainly developed for the PC, either the full registration website or a subset of its more frequently-used functions may be implemented for voice response on a registration menu on the user interface 14. In implementations in which a language type is detected, once detection has occurred, the language type information could be passed around to other sites visited by the user, e.g., Google®, Netflix®, such as to enable immediate presentation of versions of those websites specific to the language type. Similarly, following language type detection, if a form is presented on the network-enabled device, the language of the form may be automatically set to the detected language type.

A voice detection mode may automatically commence upon the attachment of the dongle or the detection of an external device, i.e., one that can act as a conduit for voice input. Alternatively, an icon on the smart phone, or a button on a remote control, can be employed to commence voice input.

A step of voice detection may be employed to detect the identity of the speaker and to automatically load a speaker's profile into a device, enabling, e.g., parental controls based on the permissions accorded the speaker. For example, if a child's voice is detected, the IPTV may be automatically set to be limited to children's programming.

Accordingly, the present invention is not limited to only those implementations described above.

The invention claimed is:

1. A method of entering data for a network-enabled device comprising:
   a. configuring a network-enabled device to be in a state to receive audio data;
   b. receiving audio data at the network-enabled device;
   c. receiving an indication of a language type;
   d. determining that the language type is unsupported;
   e. transmitting the received audio data to a first server from the network-enabled device;
   f. receiving converted data from the first server at the network-enabled device, the converted data calculated from the received audio data; and
   g. displaying an indication of the received converted data.

2. The method of claim 1, wherein the received audio data corresponds to a navigational command, and wherein the displaying an indication of the received converted data includes performing the navigational command.

3. The method of claim 1, wherein the received audio data corresponds to data to be entered into a form, and wherein the displaying an indication of the received converted data includes entering the data into the form.

4. The method of claim 1, wherein the receiving an indication of a language type includes:
   a. receiving a selection of a language type;
   b. determining a language type from a settings file;
   c. detecting a language type based on the received audio data; or
   d. transmitting the audio data to a second server, and receiving an indication of the language type from the second server.

5. The method of claim 1, wherein the received converted data is textual data.

6. The method of claim 1, wherein the received converted data is an image file indicating textual data.

7. A method of entering data for a network-enabled device comprising:
   a. configuring a network-enabled device to be in a state to receive audio data;
   b. receiving audio data at the network-enabled device;
   c. receiving an indication of a language type;
   d. determining that the language type is unsupported;
   e. transmitting a request for a language module corresponding to the language type to a server;
   f. receiving the requested language module from the server at the network-enabled device;
   g. using the received language module to convert the audio data to textual data; and
   h. displaying an indication of the textual data.

8. The method of claim 7, wherein the language module is stored on the network-enabled device, on a dongle connected to the network-enabled device, or on an external device in communication with the network-enabled device.

9. The method of claim 7, wherein the receiving an indication of a language type includes:
   a. receiving a selection of a language type;
   b. determining a language type from a settings file;
   c. detecting a language type based on the received audio data; or
   d. transmitting the audio data to a second server, and receiving an indication of the language type from the second server.

* * * * *